United States Patent [19]
Okita

[11] Patent Number: 6,023,131
[45] Date of Patent: Feb. 8, 2000

[54] BACKLIGHT DEVICE FOR A LIQUID CRYSTAL DISPLAY

[76] Inventor: Masaya Okita, 621-6 Suzuya 2-chome, Yono-shi, Saitama, Japan

[21] Appl. No.: 09/200,259

[22] Filed: Nov. 25, 1998

[30]     Foreign Application Priority Data

Nov. 27, 1997  [JP]  Japan .................................. 9-342124

[51] Int. Cl.$^7$ ............................................. G05F 1/00
[52] U.S. Cl. ................. 315/291; 315/169.3; 315/315; 315/320; 345/102; 345/204; 345/214
[58] Field of Search ................ 315/291, 209 R, 315/315, 320, 169.3, 169.4; 345/102, 204, 211, 212, 88, 87, 214

[56]         References Cited

U.S. PATENT DOCUMENTS

| 5,304,897 | 4/1994 | Sano et al. ........................... 315/209 R |
| 5,337,068 | 8/1994 | Stewart et al. ............................ 345/88 |
| 5,406,299 | 4/1995 | Post ............................................. 345/3 |
| 5,886,475 | 3/1999 | Horiuchi et al. ...................... 315/169.3 |

*Primary Examiner*—David H. Vu
*Assistant Examiner*—Haissa Philogene
*Attorney, Agent, or Firm*—Flynn, Thiel, Boutell & Tanis, P.C.

[57]          ABSTRACT

A backlight device for a color liquid crystal display includes a high-voltage generating means including a d.c. power source, an inverter and a switch interposed between the d.c. power source and the inverter to control the output supplied from the high-voltage generating means. Connected to the high-voltage generating means are three cold cathode-ray tubes in parallel for generating three colors, red, green and blue, and connected in series to respective cold cathode-ray tubes are switching means which may be bi-directional thyristors which are readily available, inexpensive, resistant to high voltages and permit a current to flow in both directions. By controlling both the output of the inverter and ON/OFF actions of the switching means in combination, the lighting of cold cathode-ray tubes can be controlled by using a single inverter

4 Claims, 4 Drawing Sheets

BACKLIGHT DEVICE FOR A LIQUID CRYSTAL DISPLAY

BACKGROUND OF THE INVENTION

1. Field of the Invention

This invention relates to a backlight device for a transmission-type liquid crystal display, especially of a field sequential system.

2. Description of the Related Art

Recently, colored liquid crystal displays have been widely used for displaying color images in notebook-type personal computers or compact liquid crystal TV monitors.

Except for special rare systems, display of color images on color liquid crystal displays relies on color filters.

In liquid crystal display devices combined with color filters to display color images, three dots of different colors, namely, red, green and blue, are combined to display a desired color. However, color filters are very expensive and need a high accuracy when bonded to panels. Moreover, they need a triple number of dots to ensure an equivalent resolution as compared with black-and-white liquid crystal display panels. Therefore, typical liquid crystal color panels require a triple number of drive circuits in the horizontal direction. This means an increase of the cost of drive circuits themselves and the cost for increased man-hours for connecting the drive circuits to the panel at a triple number of points. Thus, from the economical viewpoint, the use of color filters with liquid crystal panels to display color images involves many disadvantages.

Another problem with color filters is their optical transmittance which can be as low as 20% approximately. When color filters are used, the luminance decreases to approximately one fifth, and a large electric power is consumed for backlighting to compensate for the luminance.

Japanese Patent Laid-Open 1-179914 (1989) discloses a color liquid crystal display device employing a field sequential system to display color images by combining a black-and-white liquid crystal panel and tricolor backlighting instead of using color filters. Certainly, this method appears more likely to realize high-fidelity color images inexpensively. As to tricolor backlighting, Japanese Patent Applications Nos. 7-271994 and 8-49476 propose the use of three cold cathode-ray tubes generating three colors, red, green and blue, which are packaged in a space equivalent to that of a thin-type backlight device using conventional white cold cathode-ray tubes and optical guide plates.

However, an inverter circuit required to generate a high voltage for lighting the cold cathode-ray tubes is difficult to switch by means of an inexpensive semiconductor switch, and it was necessary to connect inverters to respective cold cathode-ray tubes so as to control the lighting of three cold cathode-ray tubes by controlling the outputs of three inverters. Moreover, although the lighting time is reduced to less than one third, the peak current does not change so much. Therefore, coils and other elements cannot be miniaturized, and three inverters of the same size as conventional inverters must be used. This is a serious problem in applications to notebook-type personal computers for which miniaturization is one of most important requirements. Also from the economical viewpoint, inverters are expensive and have as much as several times the cost of cold cathode-ray tubes.

There is another approach as shown in FIG. 3 in which switches 8, 9 and 10 made of bi-directional thyristors, which are readily available, inexpensive, resistant to high voltages, and permit electric current to flow in opposite directions, are connected in series to three cold cathode-ray tubes 5, 6 and 7 generating three colors, red, green and blue, so as to apply a voltage to them from a high-voltage generating means 4a made up of a d.c. power source 1 and an inverter 3.

However, when a voltage is applied from the high-voltage generating means 4a, the resistance to the voltage of these switches 8, 9 and 10 made of the bi-directional thyristors is not sufficient under the condition where all of the switches are turned OFF, which results in an electric discharge in one or more of these cold cathode-ray tubes 5, 6 and 7 and failure to light completely.

Therefore, it has been considered difficult to control the lighting of the cold cathode-ray tubes by bi-directional thyristors, and conventional technologies were compelled to independently connect inverters 3a, 3b and 3c to individual cold cathode-ray tubes 5, 6 and 7 as shown in FIG. 4 and to control the lighting of the cold cathode-ray tubes 5, 6 and 7 by controlling the supplied power source to the respective inverters 3a, 3b and 3c by switches 2a, 2b and 2c. Therefore, the above-indicated problems still remain.

SUMMARY OF THE INVENTION

It is therefore an object of the invention to provide a backlight device for a field sequential liquid crystal display which can control the lighting of three cathode-ray tubes with a single inverter.

According to the invention, there is provided a backlight device for a liquid crystal display, comprising:

- a high-voltage generating means whose output can be controlled;
- a plurality of discharge tubes connected to the high-voltage generating means; and
- a plurality of switching means each connected in series to each discharge tube.

DESCRIPTION OF THE PREFERRED EMBODIMENTS

Explained below is an embodiment of the invention with reference to the drawings.

Figure 1:
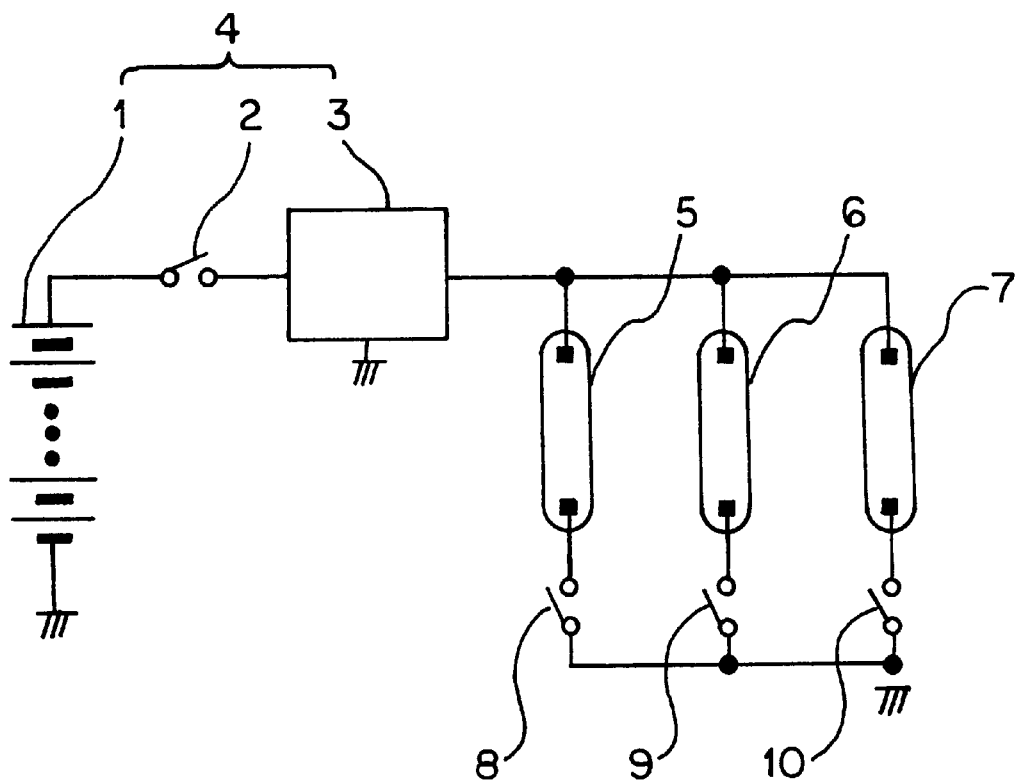
FIG. 1 is a block diagram of a backlight device according to an embodiment of the invention.

FIG. 1 is a block diagram showing a preferred embodiment of the invention, in which a d.c. power source 1, a semiconductor switch 2 made of a transistor, for example, and an inverter 3 form a high-voltage generating means 4 whose output can be controlled.

Connected to the output-controllable high-voltage generating means 4 are three cold cathode-ray tubes 5, 6 and 7 in parallel for generating three colors, red, green and blue, and connected in series to respective cold cathode-ray tubes 5, 6 and 7 are switching means 8, 9 and 10 made of bi-directional thyristors, which are readily available, inexpensive, resistant to high voltages and permit a current to flow in opposite directions.

In the embodiment shown here, by using the switch 2 for controlling the power source of the inverter 3 in the high-voltage generating means 4 in addition to the switching means 8, 9 and 10 made of bi-directional thyristors serially connected to the respective cold cathode-ray tubes 5, 6 and 7, by controlling the switch 2 and the switching means 8, 9 and 10 in combination, electric discharge from the cold cathode-ray tubes 5, 6 and 7 can be controlled stably.

In greater detail, if a high voltage is applied from the high-voltage generating means 4 when all of the bi-directional thyristors as switching means 8, 9 and 10 are OFF, an electric discharge occurs in one or more of the cold cathode-ray tubes 5, 6 and 7. However, by turning off the switch 2 forming the high-voltage generating means 4 to thereby decrease the output voltage of the inverter 3 under the critical voltage value for starting an electric discharge, the electric discharge of all cold cathode-ray tubes 5, 6 and 7 can be prevented.

As to the lighting of a cold cathode-ray tube 5, 6, 7 in the field sequential system, it is important that only one of red (R), green (G) and blue (B) cold cathode-ray tubes (CCRT) 5, 6 and 7 be turned on at a certain point in time and that an interval of several milliseconds be interposed after a cold cathode-ray tube 5, 6 or 7 is turned off before the next cold cathode-ray tube 5, 6 or 7 is turned on.

Figure 2:
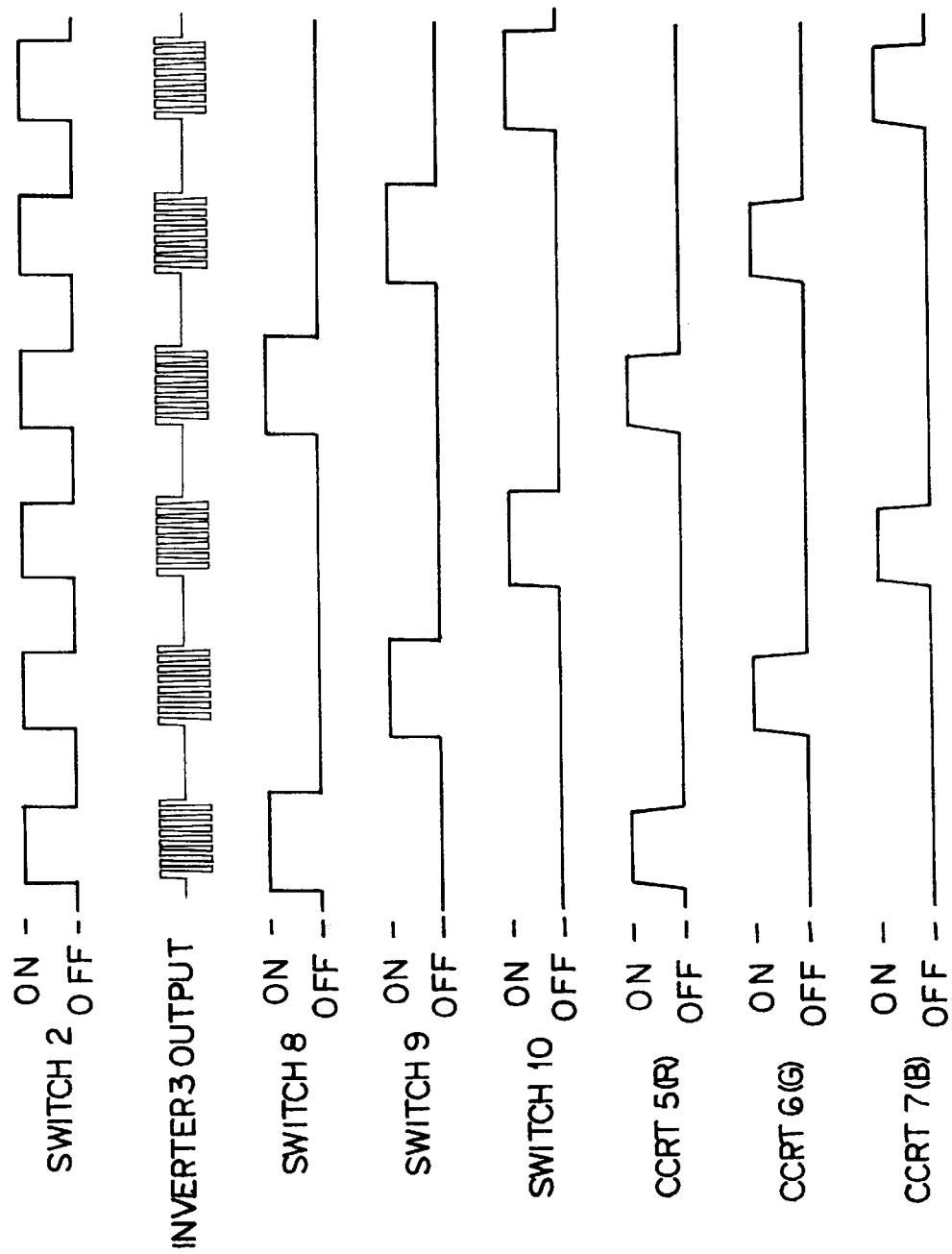
FIG. 2 is a timing chart of the backlight device according to the embodiment.
Figure 3:
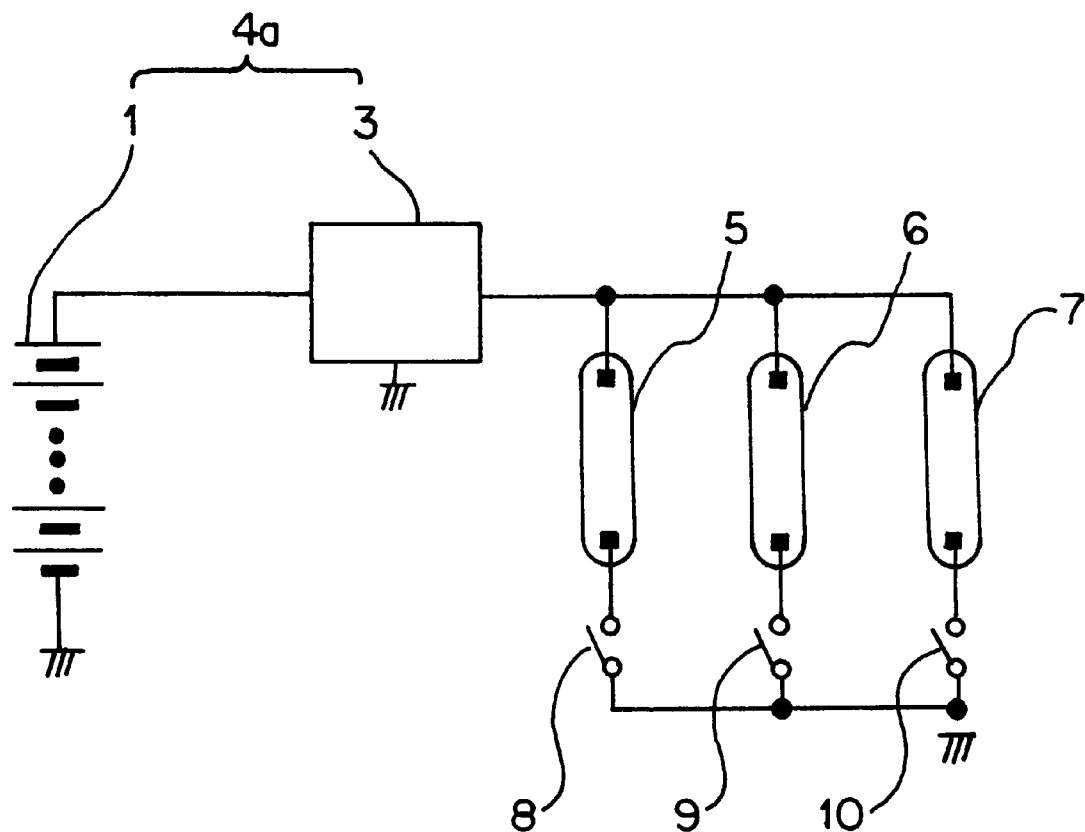
FIG. 3 is a block diagram of a conventional backlight device.
Figure 4:
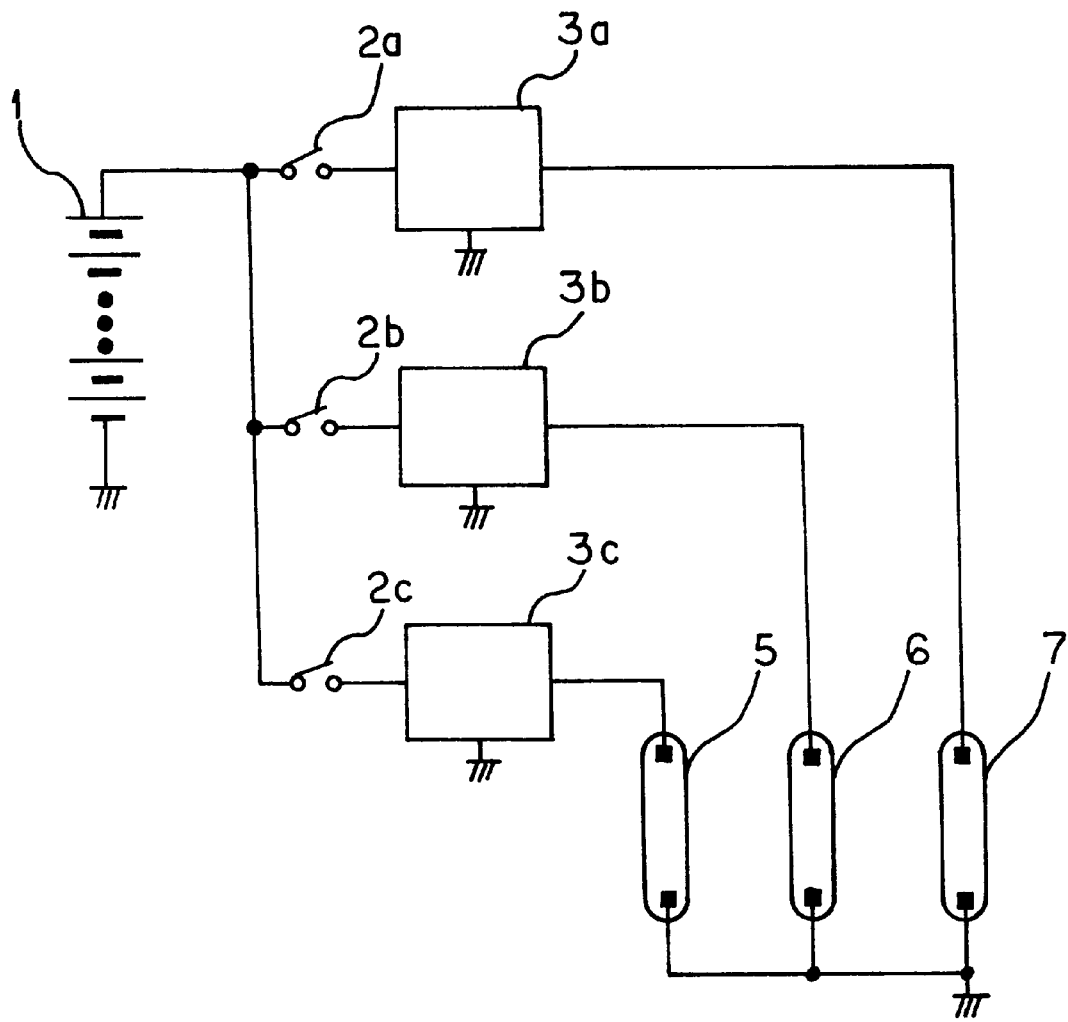
FIG. 4 is a block diagram of another conventional backlight device.

FIG. 2 shows a timing chart showing the ON/OFF states of the respective switching means 8, 9, 10 and the three cold cathode-ray tubes (CCRT) 5, 6 and 7, which are determined to meet the above-mentioned requirements. In this manner, it is ensured that only one of the switching means 8, 9 and 10 is turned ON when the switch 2 is turned ON and a high voltage is supplied from the inverter 3. In this case, if the cold cathode-ray tubes 5, 6 and 7 are equal in critical voltage for starting the electric discharge, then only one of the cold cathode-ray tubes 5, 6 and 7 serially connected to the ON-state switching means 8, 9 or 10 is turned on.

When the selected one of the cold cathode-ray tubes 5, 6 and 7 is turned on, the output voltage of the inverter 3 decreases. Therefore, an electric discharge does not occur in the other cold cathode-ray tubes 5, 6 or 7 serially connected to the OFF-state switching means 8, 9 or 10. That is, it is ensured that the selected one of the cold cathode-ray tubes 5, 6 or 7 be lit reliably and the other cold cathode-ray tubes 5, 6 or 7 do not discharge electrically.

In the timing chart of FIG. 2, after the switch 2 is turned ON and before a high voltage is supplied from the inverter 3, one of the switching means 8, 9 and 10 is turned ON. This is done to ensure that a cold cathode-ray tube 5, 6 or 7 connected to the ON-state switching means 8, 9 or 10 never fails to light. Usually, however, since the time after the switch 2 is closed to power the inverter 3 and before the inverter 3 supplies a high voltage is longer than the time before one of the switching means is turned ON, the switching means may be turned ON simultaneously with the application of the high voltage from the inverter 3. Additionally, the timing chart shown in FIG. 2 provides an interval after the switch 2 is turned OFF and before all of the switching means 8, 9 and 10 are turned off. This is done, accounting for the time required for the output of the inverter 3 in the high-voltage generating means 4 to decrease below the critical voltage value for the cold cathode-ray tubes to start electric discharge, which will be necessary in some kinds of inverters. In the above-explained manner, the lighting of cold cathode-ray tubes 5, 6 and 7 can be controlled reliably.

As described above, the invention makes it possible to control three cold cathode-ray tubes with a single inverter. That is, the invention decreases the number of inverters by two thirds, and can realize an inexpensive, compact system. Moreover, depending upon an appropriate arrangement of the switching means serially connected to the cold cathode-ray tubes, a more compact system can be obtained by decreasing the lines loaded with a high voltage to one.

Additionally, since the input of the power source to the inverter is OFF when all cold cathode-ray tubes are OFF, useless power consumption can be prevented.

The invention is applicable not only to field sequential backlight devices but also to various types of systems using a plurality of discharge tubes while switching their lighting.

What is claimed is:

1. A backlight device for a liquid crystal display, comprising:

a high-voltage generating means having a controllable output;

a plurality of discharge tubes connected to said high-voltage generating means; and a plurality of switching means, each of said switching means being connected in series to each of said discharge tubes and only one of said switching means being in an electrically conductive state during the period when a high voltage is output from said high-voltage generating means.

2. The backlight device for a liquid crystal display according to claim 1 wherein said switching means are bi-directional thyristors.

3. The backlight device for a liquid crystal display according to claim 1, wherein said discharge tubes are three cold cathode-ray tubes for generating red, green and blue light, respectively.

4. The backlight device for a liquid crystal display according to claim 1 wherein said high-voltage generating means is controlled in output by controlling the power supplied thereto.

* * * * *